US008825908B2

(12) United States Patent
Hueber

(10) Patent No.: US 8,825,908 B2
(45) Date of Patent: Sep. 2, 2014

(54) METHOD OF IDENTIFYING DEVICES ON A BUS AND APPARATUS

(75) Inventor: Gernot Hueber, Linz (AT)

(73) Assignee: Intel Mobile Communications GmbH, Neubiberg (DE)

( * ) Notice: Subject to any disclaimer, the term of this patent is extended or adjusted under 35 U.S.C. 154(b) by 39 days.

(21) Appl. No.: 12/815,474

(22) Filed: Jun. 15, 2010

(65) Prior Publication Data

US 2011/0307632 A1   Dec. 15, 2011

(51) Int. Cl.
*G06F 13/362* (2006.01)
*H04L 29/12* (2006.01)

(52) U.S. Cl.
CPC ...... *H04L 29/12254* (2013.01); *H04L 61/2038* (2013.01)
USPC .................................................. 710/3; 710/9

(58) Field of Classification Search
CPC combination set(s) only.
See application file for complete search history.

(56) References Cited

U.S. PATENT DOCUMENTS

| 5,787,306 A * | 7/1998 | Michael ............................ 710/9 |
| 6,195,712 B1 * | 2/2001 | Pawlowski et al. ............. 710/19 |
| 2002/0049822 A1 * | 4/2002 | Burkhardt et al. ............. 709/208 |
| 2004/0214527 A1 * | 10/2004 | Lim et al. ..................... 455/41.2 |
| 2007/0287542 A1 * | 12/2007 | Miyazaki et al. ............... 463/39 |

FOREIGN PATENT DOCUMENTS

| DE | 102008017509 A1 | 10/2009 |
| WO | 2009121925 A2 | 10/2009 |

OTHER PUBLICATIONS

Bluetooth SIG, "Specification of the Bluetooth System," Version 1.1, Feb. 22, 2001, pp. 51, 112, 117, 118, 146, and 147.*
Blutooth SIG, "Specification of the Bluetooth System," Version 1.1, Feb. 22, 2001, pp. 48, 49, 85, and 142.*
Wilkerson et al., "Unification in the RF front-end: the new MIPI standard"; http://eetimes.com/General/DisplayPrintViewContent?contentItemID=4210521; May 17, 2011; pp. 1-7.

* cited by examiner

*Primary Examiner* — Ilwoo Park

(57) ABSTRACT

A method of identifying devices on a bus and an apparatus are provided. A method of identifying devices on a bus comprises pooling a plurality of devices connected to a bus, each of the plurality of devices not having uniquely assigned to it a respective unique device identifier (ID) of the bus, selecting, after the pooling, one of the plurality of devices using at least one selection criteria, the at least one selection criteria identifying the one of the plurality of devices uniquely among all of the plurality of devices, and reassigning a unique device ID of the bus to the selected one of the plurality of devices uniquely. An apparatus is configured to carry out the method of identifying devices on a bus.

14 Claims, 5 Drawing Sheets

US 8,825,908 B2

METHOD OF IDENTIFYING DEVICES ON A BUS AND APPARATUS

TECHNICAL FIELD

Embodiments of the invention relate generally to a method of identifying devices on a bus and to a corresponding apparatus.

BRIEF DESCRIPTION OF THE SEVERAL VIEWS OF THE DRAWINGS

In the drawings, like reference characters generally refer to the same parts throughout the different views. The drawings are not necessarily to scale, emphasis instead generally being placed upon illustrating the principles of the invention.

DETAILED DESCRIPTION OF THE INVENTION

The following detailed description explains exemplary embodiments of the present invention. Where applicable the description of a method embodiment is deemed to describe also the functioning of a corresponding apparatus embodiment and vice versa. The description is not to be taken in a limiting sense, but is made only for the purpose of illustrating the general principles of the invention. The scope of the invention, however, is only defined by the claims and is not intended to be limited by the exemplary embodiments described below.

Figure 1:
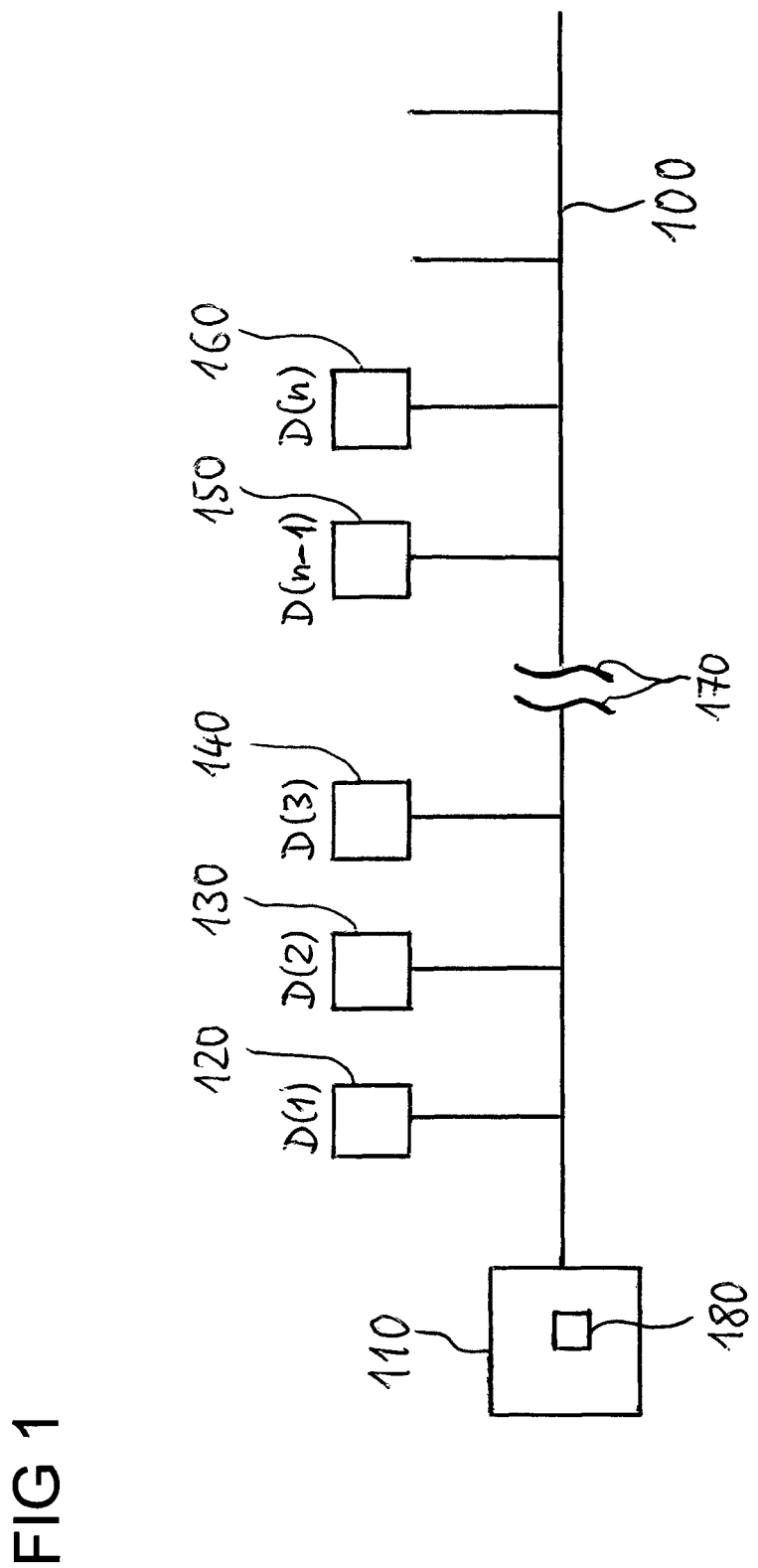
FIG. 1 shows a schematic view of a bus interface and an apparatus in accordance with an embodiment of the invention.

In FIG. 1 a schematic view of a bus interface and an apparatus in accordance with an embodiment of the invention are shown.

A bus 100 is controlled by a bus controller (master) 110. A number n of devices (slaves) D(1) 120, D(2) 130, D(3) 140, . . . , D(n−1) 150 and D(n) 160 are connected to the bus 100. Not shown in the diagram are the devices numbered 4 to n−2. This is symbolized by the interruption 170 of the bus in the drawing. The number n is for example 1, 2, 3, 4, 5, or any other number. For example n may be in the range 10 to 20, in the range 20 to 50 or in the range 50 to 100.

Generally it is desirable to be able to connect as many devices as needed to a bus without slowing down the operation of the bus too much and without adding too much complexity or implementation effort.

According to an embodiment of the invention, the following method steps are performed: pooling a plurality of devices connected to a bus, each of the plurality of devices not having uniquely assigned to it a respective unique device identifier (ID) of the bus; selecting, after the pooling, one of the plurality of devices using at least one selection criteria, the at least one selection criteria identifying the one of the plurality of devices uniquely among all of the plurality of devices; and reassigning a unique device ID (UID) of the bus to the selected one of the plurality of devices uniquely.

According to an embodiment of the invention, an apparatus comprises a control unit to pool a plurality of devices connected to a bus, each of the plurality of devices not having uniquely assigned to it a respective unique device identifier (ID) of the bus; the control unit further to select one of the pooled plurality of devices using at least one selection criteria, the at least one selection criteria identifying the one of the plurality of devices uniquely among all of the plurality of devices; and the control unit further to reassign a unique device ID (UID) of the bus to the selected one of the plurality of devices uniquely.

This has the effect that the bus can be operated with a virtually almost unlimited number of devices using a given address space of unique device IDs which is only capable of addressing a limited number of devices. For example the bus can be operated with a number n of devices using an address space providing m unique device IDs where n is larger than m, for example n is much larger than m.

According to an embodiment of the invention, the bus controller 110 has a control unit 180 configured to pool a plurality of devices D(1) 120, D(2) 130, D(3) 140, . . . , D(n−1) 150 and D(n) 160 connected to the bus 100, each of the plurality of devices not having uniquely assigned to it a respective unique device identifier (ID) of the bus; the control unit 180 is further configured to select one of the pooled plurality of devices using at least one selection criteria, the at least one selection criteria identifying the one of the plurality of devices uniquely among all of the plurality of devices; and the control unit 180 is further configured to reassign a unique device ID of the bus 100 to the selected one of the plurality of devices uniquely.

The concept of unique device IDs is explained in more detail in the following. In a bus interface like the one shown in FIG. 1 the devices on a bus are uniquely identified by an identifier or identification (ID), a unique device ID (UID). Especially in legacy bus specifications and for interfaces with real time constraints the commands (sequences) on the bus are optimized for length. As a result the address space for device ID is strictly limited and cannot be extended, e.g. the number of bits for the device ID may be 4 bits enabling addressing a maximum of 16 devices.

Address space limitations may possibly be overcome by several techniques. However, some of these approaches include significant disadvantages: Adding more bits to the address/ID field is at the cost of breaking the sequence/frame structure of the bus specification. Employing parallel busses seems to be feasible in single master systems, while in multi-master systems masters have to be present on all busses or a router device adding additional complexity and delay is needed. Parallel busses generally demand for additional pads/pins and PCB routing/wiring resources.

In many bus applications many devices have to be available, but most of them are unused at the same time. One aspect of the invention can be illustratively seen in that this fact is employed here.

According to an embodiment of the invention, the limited device ID address space is extended by pooling of devices without ID and re-programming of IDs.

According to an embodiment of the invention, device pooling, selection and dynamic allocation of device IDs are included in this embodiment. Device pooling means that devices not used during some period have no unique device ID, but are put in a pool of devices. Selection means that devices in the pool are identified by some measure beyond the short device ID like e.g. manufacturer ID, product ID, serial number, pin/pad programming, fusing, and the like. Dynamic allocation of device IDs means that device IDs can be reprogrammed within the limited space available, for example a free device ID can be allocated, or a (currently) unused device returns its device ID which afterwards is given to another device.

Embodiments of the invention have the effect that no change in protocol in terms of bits for the ID is needed. Embodiments of the invention have the effect that these embodiments may without major changes of the bus be applied to a bus where dynamic allocation is supported by the bus specification. Embodiments of the invention have the effect that no parallel busses are needed and thus resources (pins/pads/PCB area/wiring) are saved.

Embodiments of the invention may for example be applied to a bus capable of real time operation, the bus being used to control radio frequency front end components in a mobile phone or mobile phone system or mobile phone base station. In other words, the bus is configured to address devices operating under real time conditions, and these devices may for example be radio frequency front end components in a mobile phone or mobile phone system or mobile phone base station.

Figure 2:
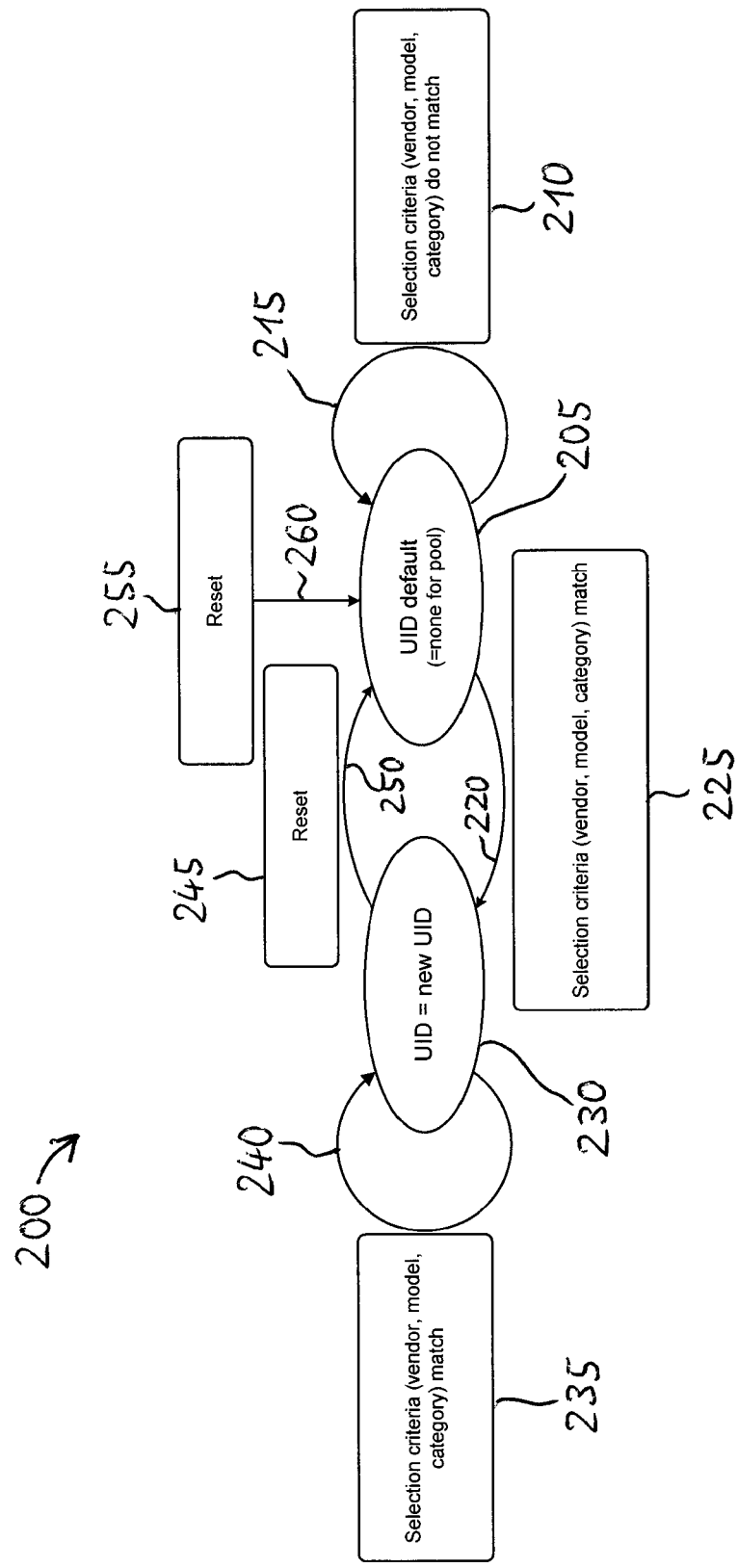
FIG. 2 shows a state diagram of a dynamic allocation scheme for reassigning a unique device identifier (ID) in accordance with an embodiment of the invention.

In FIG. 2 a state diagram 200 of a dynamic allocation scheme for reassigning a unique device identifier (ID) in accordance with an embodiment of the invention is shown.

Referring to FIG. 2, in the following an example method for reprogramming of unique ID (UID) is explained with the extensions necessary to the procedure.

The state diagram 200 visualizes a dynamic slave address allocation scheme for programming a new UID to a slave. The device (slave) has a default UID state 205 which is entered e.g. after a reset. In the default UID state 205 the device is in the pool of devices not having uniquely assigned to it a respective unique device identifier (ID) of the bus. As long as the selection criteria (vendor, model, category, etc.) do not match to the respective values of the slave (condition 210) the default state 205 is continued which is represented by the loop 215.

A UID is programmed (state transition 220) if all criteria (vendor, model, type, etc.) used to uniquely identify a device match to the respective values of the slave (condition 225). In other words, a unique device ID of the bus is reassigned to the selected one of the pooled plurality of devices uniquely. By this the state "UID=new UID" 230 is entered. As long as the selection criteria (vendor, model, category, etc.) do still match to the respective values of the slave (condition 235) the state "UID=new UID" 230 is continued which is represented by the loop 240.

By issuing a reset by command sequence (reset 245) the UID shall be returned (state transition 250) to its default value (default UID state 205). Similarly, by issuing a reset by signal (reset 255), the UID shall be returned (state transition 260) to its default value (default UID state 205).

As a prerequisite for the dynamic address allocation scheme, the combination of the used selection criteria (vendor, model, type, etc.) have to be unique. Supported by the wide range of slave devices and vendors for these slave devices an optional programmable UID feature can be realized.

In the following Table 1 an example is given how the reprogramming of unique ID (UID) can be done at register level.

| Register Address | Name | Note |
| --- | --- | --- |
| 0x01 | Vendor_id | Vendor_id of device |
| 0x02 | Model_id | Model number |
| 0x03 | Category | Category of device (PA, LNA, switch, . . .) |
| 0x04 | Spare | Spare but tied to pin, pad, fuse etc. |
| 0x05 | UID | New UID to be programmed and used in future read/write cycles to the device |

Here some programmable unique slave ID (USID) registers are listed with a register address, a register name and a register description for each register. Registers 0x01 to 0x04 select uniquely a device in the pool, while write access to register 0x05 assigns a new UID to be used in future bus access sequences.

According to an embodiment of the invention, the crucial extension is that the sequence of reprogramming a UID to a slave does not require the slave to have a unique ID a priori. For example, a reprogramming sequence (see Table 1) sent to a broadcast (or group slave) ID can be used. Alternatively, one of the available unique device IDs can be used for addressing the devices (slaves) in the pool of devices. In this case, this UID is assigned to all devices in the pool commonly which stands in contrast to the usual case, where a UID is always assigned to a single device uniquely.

The slave is identified by the selection criteria, which in this example are vendor, model and category. Additionally, the spare bits in register 0x04 bound to pin, pad, fuse, or any other identification measure allow distinguishing otherwise identical devices (e.g. same manufacturer and same model) on the bus.

Figure 3:
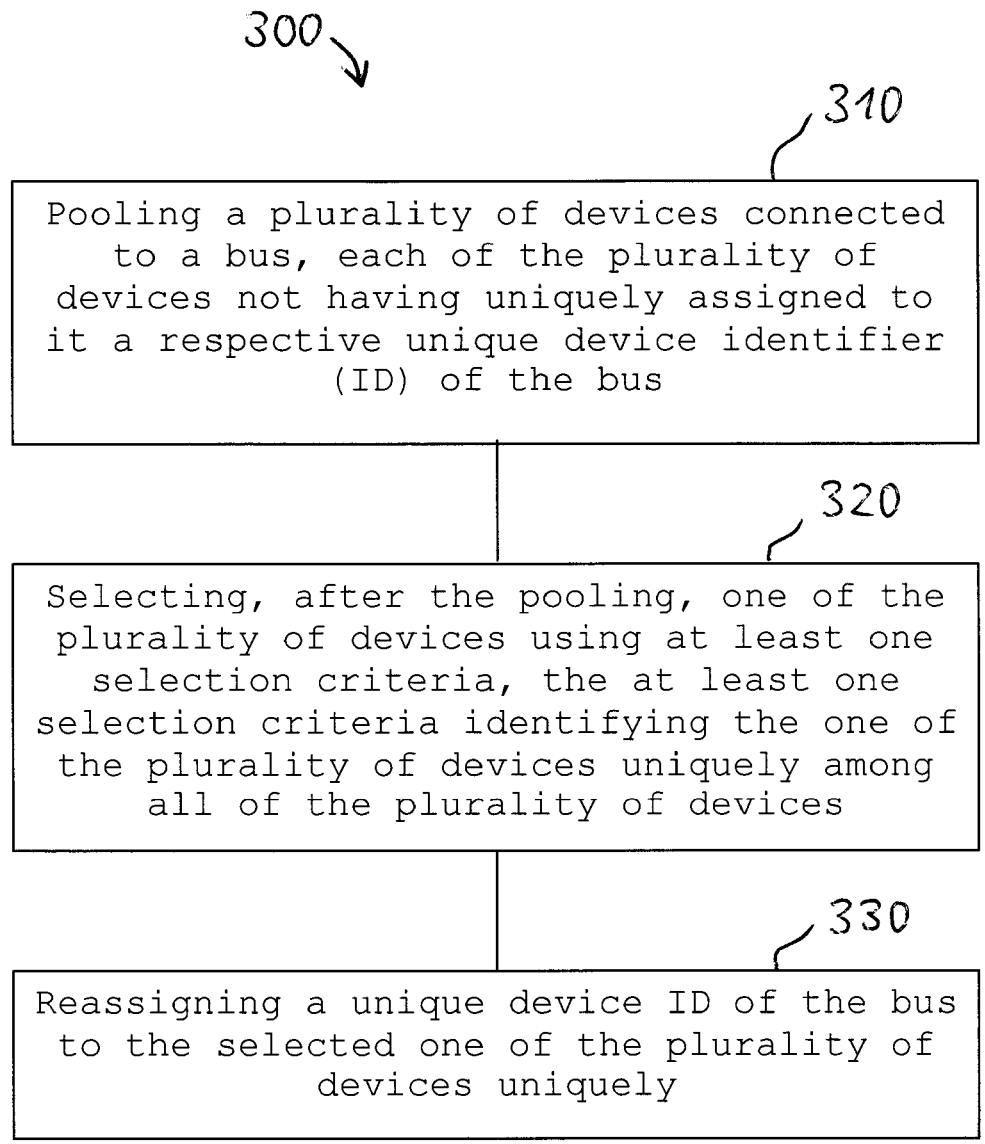
FIG. 3 shows a method of identifying devices on a bus in accordance with an embodiment of the invention in a flow diagram.

In FIG. 3 a method of identifying devices on a bus in accordance with an embodiment of the invention is shown in the flow diagram 300.

At 310 a plurality of devices connected to a bus is pooled, each of the plurality of devices not having uniquely assigned to it a respective unique device identifier (ID) of the bus.

At 320, after the pooling, one of the plurality of devices is selected using at least one selection criteria, the at least one selection criteria identifying the one of the plurality of devices uniquely among all of the plurality of devices.

At 330 a unique device ID of the bus is reassigned to the selected one of the plurality of devices uniquely.

According to an embodiment, the method of identifying devices on a bus further comprises addressing, after the reassigning, the selected one of the plurality of devices using the unique device ID.

According to an embodiment, the method of identifying devices on a bus further comprises withdrawing, before the reassigning, the unique device ID from another device connected to the bus, the unique device ID having been previously assigned to the other device.

According to an embodiment, the method of identifying devices on a bus further comprises adding, after the withdrawing, the other device to the pooled plurality of devices.

According to an embodiment, the at least one selection criteria includes one or more of the group consisting of a manufacturer ID, a vendor ID, a model ID, a category ID, a device serial number, a pin related ID, a pad related ID and a fusing related ID.

According to an embodiment, the bus is a bus being subject to real time operating conditions.

According to an embodiment, the bus is a bus capable of real time operation, the bus further to address radio frequency front end components of a mobile phone.

Figure 4:
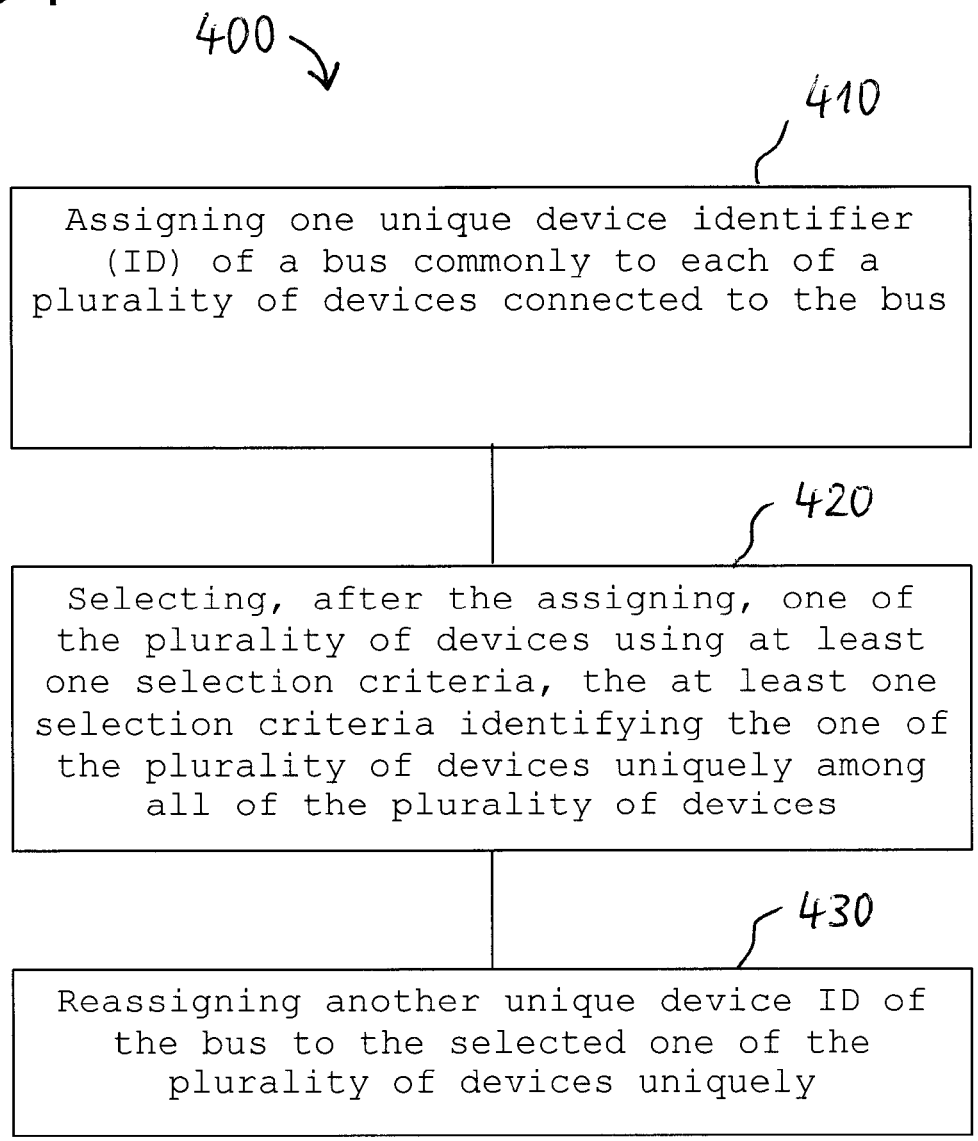
FIG. 4 shows a method of identifying devices on a bus in accordance with another embodiment of the invention in a flow diagram.

In FIG. 4 a method of identifying devices on a bus in accordance with another embodiment of the invention is shown in the flow diagram 400.

At 410 one unique device identifier (ID) of a bus is assigned commonly to each of a plurality of devices connected to the bus.

At 420, after the assigning, one of the plurality of devices is selected using at least one selection criteria, the at least one selection criteria identifying the one of the plurality of devices uniquely among all of the plurality of devices.

At 430, another unique device ID of the bus is reassigned to the selected one of the plurality of devices uniquely.

According to an embodiment, the method of identifying devices on a bus further comprises addressing, after the reassigning, the selected one of the plurality of devices using the other unique device ID.

According to an embodiment, the method of identifying devices on a bus further comprises withdrawing, before the reassigning, the other unique device ID from another device connected to the bus, the other unique device ID having been previously assigned to the other device.

According to an embodiment, the method of identifying devices on a bus further comprises assigning, after the withdrawing, the unique device ID to the other device in addition to and commonly with each of the plurality of devices.

Figure 5:
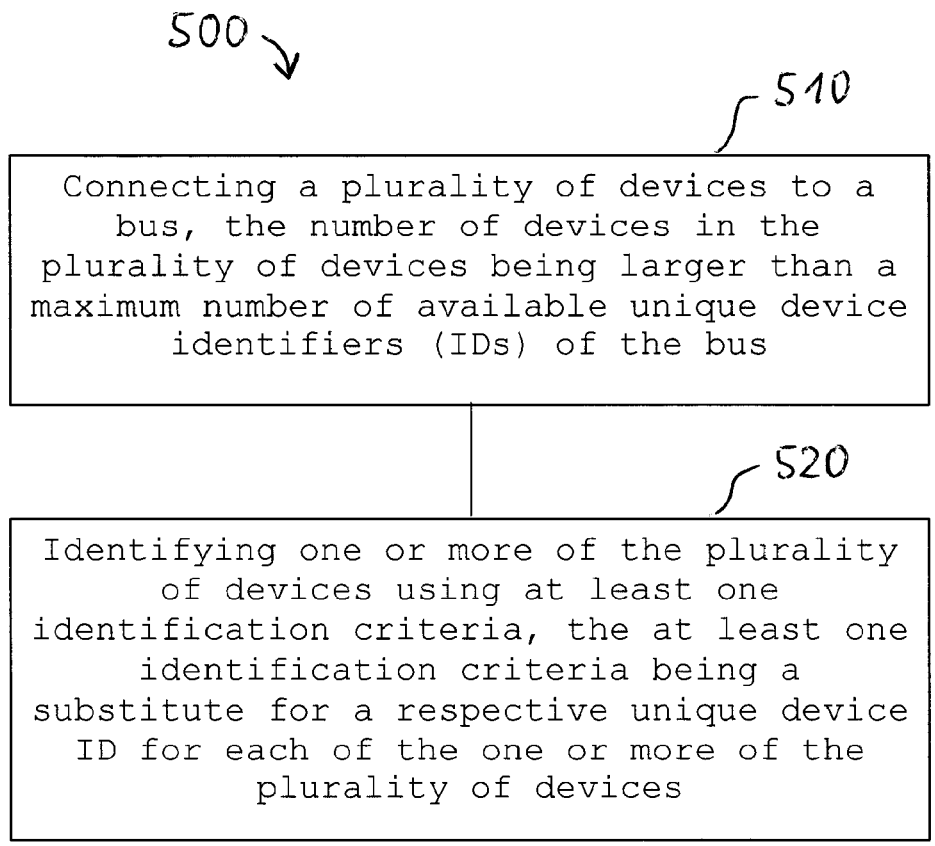
FIG. 5 shows a method of identifying devices on a bus in accordance with yet another embodiment of the invention in a flow diagram.

In FIG. 5 a method of identifying devices on a bus in accordance with yet another embodiment of the invention is shown in the flow diagram 500.

At 510 a plurality of devices is connected to a bus, the number of devices in the plurality of devices being larger than a maximum number of available unique device identifiers (IDs) of the bus.

At 520 one or more of the plurality of devices are identified using at least one identification criteria, the at least one identification criteria being a substitute for a respective unique device ID for each of the one or more of the plurality of devices.

According to an embodiment, the method of identifying devices on a bus further comprises withdrawing a unique device ID from another device connected to the bus, the unique device ID having been previously assigned to the other device.

According to an embodiment, the method of identifying devices on a bus further comprises reassigning, after the identifying, the unique device ID to one of the identified one or more of the plurality of devices.

According to an embodiment, the method of identifying devices on a bus further comprises addressing, after the reassigning, the one of the identified one or more of the plurality of devices using the unique device ID.

According to a further embodiment of the invention, an apparatus comprises a control unit configured to carry out a method according to an embodiment of the invention.

According to yet a further embodiment of the invention, any embodiment defined by one of the claims may be combined with any one or more other embodiments defined by respective one or more of the other claims.

The invention claimed is:

1. A method of identifying devices on a bus, comprising:
   assigning commonly a group device ID to each of a plurality of devices connected to a bus, wherein each of the plurality of devices not having uniquely assigned to it a respective unique device identifier (ID) of the bus, and wherein the group device ID is one of a plurality of unique device IDs of the bus;
   pooling the plurality of devices connected to a bus;
   selecting, after the pooling, one of the plurality of devices using at least one selection criteria, the at least one selection criteria identifying the one of the plurality of devices uniquely among all of the plurality of devices;
   reassigning one of the plurality of unique device IDs of the bus to the selected one of the plurality of devices uniquely;
   withdrawing, before the reassigning, the reassigned unique device ID from another device connected to the bus, the reassigned unique device ID having been previously assigned to the other device;
   adding, after the withdrawing, the other device to the pooled plurality of devices; and
   wherein the number of devices in the plurality of devices is greater than a maximum number of available unique device identifiers (IDs) of the bus, and
   wherein the reassigned unique device ID is assigned to the selected device is for as long as the selection criteria matches to the selected device.

2. The method as recited in claim 1, further comprising:
   addressing, after the reassigning, the selected one of the plurality of devices using the unique device ID.

3. The method as recited in claim 1, wherein the bus is a bus being subject to real time operating conditions.

4. The method as recited in claim 1, wherein the bus is a bus capable of real time operation, the bus further to address devices operating subject to real time conditions.

5. The method as recited in claim 1, wherein the bus is a bus capable of real time operation, the bus further to address radio frequency front end components of a mobile phone.

6. The method as recited in claim 1, wherein the at least one selection criteria includes one or more of the group consisting of a manufacturer ID, a vendor ID, a model ID, a category ID, a device serial number, a pin related ID, a pad related ID and a fusing related ID.

7. An apparatus, comprising:
   a control unit configured to assign commonly a group device identifier (ID) to each of a plurality connected to a bus, wherein each of the plurality of devices not having uniquely assigned to it a respective unique device ID of the bus, and wherein the group device ID is one of a plurality of unique device IDs of the bus;
   a control unit configured to pool a plurality of devices connected to a bus;
   the control unit further configured to select one of the pooled plurality of devices using at least one selection criteria, the at least one selection criteria identifying the one of the plurality of devices uniquely among all of the plurality of devices;
   the control unit further configured to reassign one of the plurality of unique device IDs of the bus to the selected one of the plurality of devices uniquely;
   the control unit further configured to withdraw, before the reassigning, the reassigned unique device ID from another device connected to the bus, the reassigned unique device ID having been previously assigned to the other device;
   the control unit further configured to add the other device to the pooled plurality of devices; and
   wherein the number of devices in the plurality of devices is greater than a maximum number of available unique device identifiers (IDs) of the bus, and wherein the reassigned unique device ID is assigned to the selected device is for as long as the selection criteria matches to the selected device.

8. The apparatus as recited in claim 7, the control unit further to address the selected one of the plurality of devices using the unique device ID.

9. A method of identifying devices on a bus, comprising:
assigning a group device identifier (ID) commonly to each of a plurality of devices connected to the bus, wherein the group device ID is one of a plurality of unique device IDs of the bus;
selecting, after the assigning, one of the plurality of devices using at least one selection criteria, the at least one selection criteria identifying the one of the plurality of devices uniquely among all of the plurality of devices; and
reassigning one of the plurality of unique device IDs of the bus to the selected one of the plurality of devices uniquely, and
wherein the number of devices in the plurality of devices being larger than a maximum number of available unique device identifiers (IDs) of the bus, and
wherein the reassigned unique device ID is assigned to the selected device is for as long as the selection criteria matches to the selected device.

10. The method as recited in claim 9, further comprising: addressing, after the reassigning, the selected one of the plurality of devices using the other unique device ID.

11. The method as recited in claim 9, further comprising: withdrawing, before the reassigning, the other unique device ID from another device connected to the bus, the other unique device ID having been previously assigned to the other device.

12. The method as recited in claim 11, further comprising: assigning, after the withdrawing, the unique device ID to the other device in addition to and commonly with each of the plurality of devices.

13. A method of identifying devices on a bus, comprising:
connecting a plurality of devices to a bus, the number of devices in the plurality of devices being larger than a maximum number of available unique device identifiers (IDs) of the bus;
assigning commonly a group device ID to each of a plurality of devices connected to a bus, wherein each of the plurality of devices not having uniquely assigned to it a respective unique device identifier (ID) of the bus, and wherein the group device ID is one of a plurality of unique device IDs of the bus;
identifying one or more of the plurality of devices using at least one identification criteria, the at least one identification criteria being a substitute for a respective unique device ID for each of the one or more of the plurality of devices;
withdrawing a unique device ID from another device connected to the bus, the unique device ID having been previously assigned to the other device;
reassigning, after the identifying, the unique device ID to the identified devices; and
wherein the unique device ID is assigned to the identified device is for as long as the at least one identification criteria matches to the identified device.

14. The method as recited in claim 13, further comprising: addressing, after the reassigning, the one of the identified one or more of the plurality of devices using the unique device ID.

* * * * *